United States Patent [19]

Roxlo

[11] Patent Number: 4,863,245
[45] Date of Patent: Sep. 5, 1989

[54] SUPERLATTICE ELECTROOPTIC DEVICES

[75] Inventor: Charles B. Roxlo, Bridgewater, N.J.

[73] Assignee: Exxon Research and Engineering Company, Florham Park, N.J.

[21] Appl. No.: 236,968

[22] Filed: Aug. 25, 1988

Related U.S. Application Data

[63] Continuation of Ser. No. 21,233, Mar. 3, 1987, abandoned, which is a continuation of Ser. No. 659,187, Oct. 9, 1984, abandoned, which is a continuation-in-part of Ser. No. 584,540, Feb. 28, 1984, abandoned.

[51] Int. Cl.$^4$ .............................................. G02F 1/015
[52] U.S. Cl. .................................... 350/356; 350/354; 357/16
[58] Field of Search ............... 350/354, 356, 386, 390; 357/421, 16

[56] References Cited

U.S. PATENT DOCUMENTS

| | | | |
|---|---|---|---|
| 3,746,879 | 7/1973 | Esaki et al. | 307/88.3 |
| 3,893,148 | 7/1975 | Madjid | 357/16 |
| 4,208,667 | 6/1980 | Chang et al. | 357/16 |
| 4,250,515 | 2/1981 | Esaki et al. | 357/16 |
| 4,525,687 | 6/1985 | Chemla et al. | 332/7.51 |
| 4,549,788 | 10/1985 | Chemla | 350/354 |

OTHER PUBLICATIONS

Roxlo et al., "Electroabsorption Spectroscopy of Well and Barrier Materials in Amorphous Semiconductor Superlattices", *Applied Physics Letters*, vol. 45, No. 10, Nov. 15, 1984, pp. 1132-1134.

Roxlo et al., "Evidence for Lattice-Mismatch-Induced Defects in Amorphous Semiconductor Heterojunctions," *Physical Review Letters*, vol. 52, No. 22, May 28, 1984, pp. 1994-1997.

Abeles et al., "Amorphous Semiconductor Superlattices", *Physical Review Letters*, vol. 51, No. 21, Nov. 22, 1983, pp. 2003-2006.

Munekata et al., "Optical Properties of a-Si:H-/a-Si$_{0.2}$C$_{0.8}$:H Quantum Well Structures", *Journal of Non-Crystalline Solids*, vols. 59 and 60, pp. 1167-1170.

Dohler, G. H., "Doping Superlattices," *Journal of Vacuum Science Technology*, vol. 16, No. 3, May/Jun. 1979, pp. 851-856.

Dohler, G. H. "Solid-State Superlattices," *Scientific American*, Nov. 1983, pp. 144-151.

Tiedje et al., "Charge Transfer Doping in Amorphous Semiconductor Superlattices," *Applied Physics Letters*, vol. 45, No. 2, Jul. 15, 1984, pp. 179-181.

*Primary Examiner*—Bruce Y. Arnold
*Assistant Examiner*—Martin Lerner
*Attorney, Agent, or Firm*—Ronald D. Hantman

[57] ABSTRACT

Electrooptic devices for the modulation and conversion of light which include semiconductor superlattices which have large electrooptic and non-linear optical coefficients due to their built-in electric fields. These materials can be deposited at low temperatures onto virtually any substrate.

7 Claims, 7 Drawing Sheets

SUPERLATTICE ELECTROOPTIC DEVICES

This application is a Rule 60 Continuation of U.S. Ser. No. 021,233, filed Mar. 3, 1987, now abandoned, which is a Rule 60 Continuation of U.S. Ser. No. 659,187, now abandoned, filed Oct. 9, 1984, which is a CIP of U.S. Ser. No. 584,540, now abandoned, filed Feb. 28, 1984.

BACKGROUND OF THE INVENTION

The present invention relates to electrooptic devices whose active material is a superlattice material.

It is known that electromagnetic wave propagation in an isotropic medium causes the induced polarization to be parallel to the electric field and to be related to it by a (scalar) factor that is independent of the direction along which the field is applied. This situation does not apply in the case of anisotropic crystals. Since the crystal is made up of a regular periodic array of atoms (or ions), the induced polarization will depend, both in its magnitude and direction, on the direction of the propagating field. Instead of a simple relation linking the induced polarization p, and the electric field, E, a $3 \times 3$ array called the electric susceptibility tensor relates p to E. One of the most important consequences of anisotropic dielectric crystals is the phenomenon of birefringence in which the phase velocity of an optical beam propagating in the crystal depends on the direction of polarization of its electric field vector.

It is possible to effect a change in the index of refraction of anisotropic crystals which is proportional to an applied electric field. This is the linear electrooptic effect. It affords a convenient and widely used means of controlling the intensity or phase of propagating optical radiation in the crystal by the applied electric field. This modulation is used in an ever expanding number of applications including:

the impression of information onto optical beams,
Q-switching of lasers for generation of giant optical pulses, mode locking, and optical beam deflection.

The linear electrooptic effect is the change in the indices of the ordinary and extraordinary rays that is caused by and is proportional to an applied electric field. This effect exists only in crystals that do not possess inversion symmetry. The division of all crystal classes into those that do and those that do not possess an inversion symmetry is an elementary consideration in crystallography and this information is widely tabulated. Up to the present time, crystalline materials have been used almost exclusively in electrooptic devices. This is because non-zero electrooptic coefficients occur only in materials which lack a center of symmetry. In the present invention, semiconductor and insulator superlattice materials are used as the active material for electrooptic devices. The superlattice materials are suitable because they lack symmetry due to the presence of large built-in electric fields in each layer.

These superlattice materials have electrooptic coefficients comparable to the best crystalline materials available. They also have the considerable advantage that they can be deposited at a relatively low temperature onto a wide variety of substrates. They can be used for both longitudinal and transverse optical modulators.

SUMMARY OF THE INVENTION

The present invention is an electrooptic device whose active material is a superlattice which includes a multi-layered material in which electric fields exist between adjacent layers. The active material may be crystalline or amorphous provided that the material lacks reflection symmetry.

In a preferred embodiment, the present invention includes an amorphous superlattice material. In another embodiment, the superlattice is a-Si:H/a-SiN$_x$:H.

DESCRIPTION OF THE PREFERRED EMBODIMENT

For purposes of illustration, the present invention will be described by an electrooptic device whose active material is an amorphous superlattice material. Such a description is not intended to limit the scope of the invention.

SUPERLATTICE MATERIAL

Figure 3:
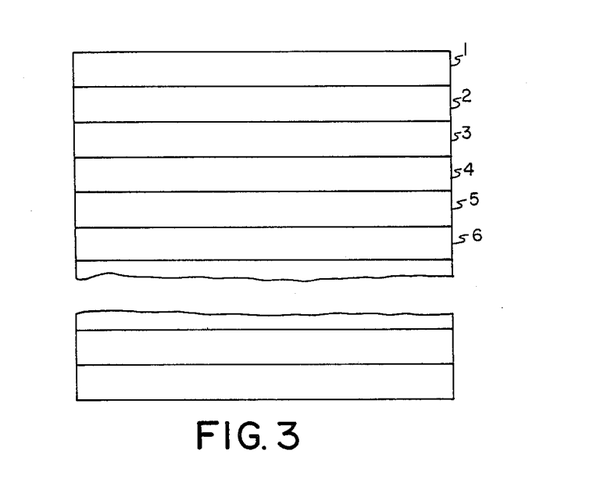
FIG. 3 shows a multilayered structure of alternating wide bandgap and narrow bandgap amorphous semiconductor layers.

An amorphous superlattice includes multi-layered material whose layers are thin sheets of semi-conducting or insulating amorphous material. In a preferred embodiment, the material is formed from tetrahedrally bonded elements or alloys containing said tetrahedrally bonded elements. Each layer is less than 1500 Å thick. In a preferred embodiment, the entire layered structure is a thin film material, that is a material that is less than about 10 microns thick. Referring to FIG. 3 the first and alternate layers 1, 3, 5 of the structure have the same given composition while the second and alternate layers 2, 4, 6 ... have the same composition different from the given composition of layers 1, 3, 5 .... Therefore, the spatial repeat distance of the material is the thickness of layer 1 plus layer 2. That is, layer 3 plus layer 4 is a repeat of layer 1 plus layer 2, etc.

A superlattice material can also be made up of three types of layers, where layers 1, 4, 7 . . . are of the first type, 2, 5, 8 . . . are of the second type, and so on. Alternatively, the material composition can be graded continuously, with the composition returning to the original value after a certain repeat distance and the entire cycle starting again.

Superlattice materials can be made up of amorphous materials or of crystalline materials.

The optical bandgap (as discussed below) of the composition may differ from that of materials comprising the individual layers. In a preferred embodiment, the repeat distance is of order 20 A.

Figure 1:
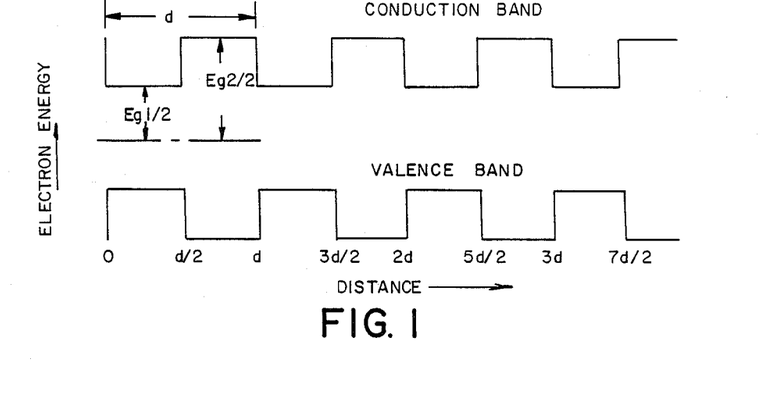
FIG. 1 shows a schematic energy band diagram for electrons and holes in semiconductor superlattice material, in which the compositional modulation is due to alloying or other gross compositional variation.
Figure 2:
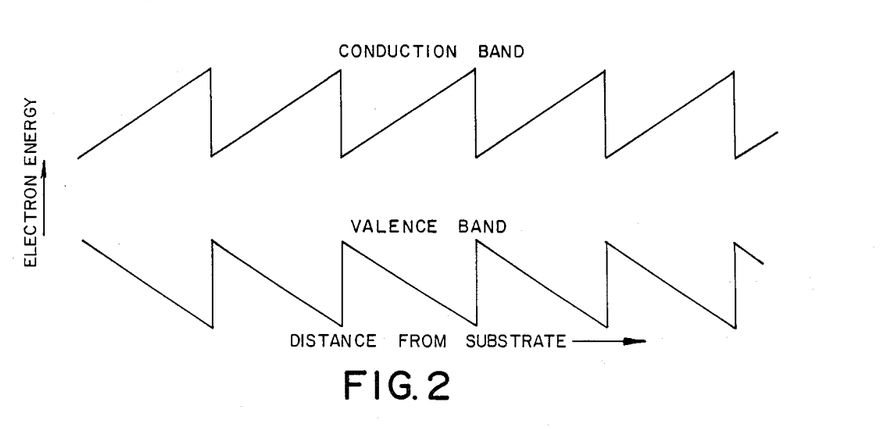
FIG. 2 shows an energy band diagram for a semiconductor superlattice material in which the compositional modulation is asymmetric.

A description of the electronic energy levels in terms of well defined E vs k relations, where E is the electronic energy and k is its wavevector, is not possible in amorphous semiconductors in the same way as it is in crystalline semiconductors. Nevertheless, some general features of the electronic energy level spectrum are known to be the same in both crystalline and low defect density amorphous semiconductors. For example, both types of semiconductors have a gap in the density of states between a broad distribution of filled levels (the valence band) and a broad distribution of empty levels (the conduction band). In crystals these energy bands have relatively sharp edges, broadened only by the thermal motion of the crystal lattice. In amorphous semiconductors the density of states edges are broader, being broadened by the structural disorder of the amorphous network in addition to the thermal motion of the atoms. The width of the low energy absorption tail of the optical absorption edge is one measure of the sharpness of the band edges in amorphous or crystalline semiconductors. In any case, an objective measure of the position of the band edges can be defined for both crystalline or amorphous semiconductors by, for example, the energy at which the density of states of the bulk material drops to $10^{20}$ cm$^{-3}$ ev.$^{-1}$. In this sense, energy band diagrams such as those shown in FIGS. 1 and 2, as described above can equally well be applied to amorphous and crystalline semiconductors. The modulation in the band edge energies illustrated in FIGS. 1 and 2 is obtained by modulation of the thin film composition.

Figure 4:
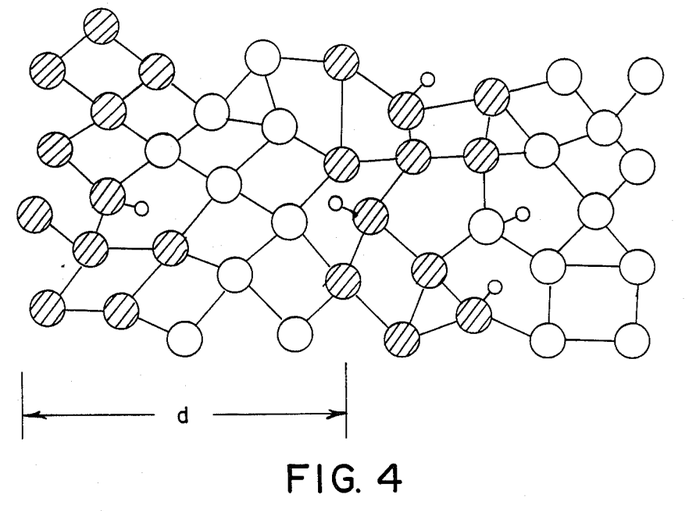
FIG. 4 is a schematic diagram of the position of the individual atoms in the superlattice structure of the present invention.

The interfacial regions between the layers of the composition of matter of the present invention are substantially defect free. There exist some defects at the interfaces which cause built-in electric fields, as will be discussed below. Referring to FIG. 4 shows a schematic diagram of the lattice structure of the present invention in which the atoms of the alternating layers are indicated by light and dark circles and hydrogen atoms by smaller light circles. The period of structures is d. As is wellknown in the art hydrogen incorporated into the structure has a beneficial effect towards reducing the density of dangling bonds.

Examples of amorphous semiconducting and insulating materials that can be fabricated into amorphous semiconductor superlattices according to this invention, can be divided into two classes:

(1) Group IVA Elements and Alloys include:
a-Si:H, a-Ge:H, a-Si$_{1-x}$C$_x$:H, a-Si$_{1-x}$ Ge$_x$:H, a-Si$_{1-x}$N$_x$:H, a-Si$_{1-x}$Sn$_x$:H, a-Si$_{1-x}$ Sn$_x$:H, a-Si$_{1-x}$O$_x$:H, a-C:H (tetrahedrally coordinated) a-Si$_{1-x-y}$ O$_x$N$_y$:H plus alloys and halogenated (F, Cl) versions of the hydrogenated materials listed (e.g. a-Si$_{1-x-y}$ Ge$_x$Sn$_y$:H:F).

(2) Group IVA Elements and Alloys Doped with Group IIIA and VA Elements

Suitable n type dopants include N, P, As, Sb, and suitable p type dopants include B, Al, Ga, In, Tl.

As used herein, the subscripts are the atomic fractions of the elements in the material. For example, if $x=\frac{2}{3}$, then a-Si$_{1-x}$O$_x$:H is a-Si$_{\frac{1}{3}}$O$_{\frac{2}{3}}$:H which is a-SiO$_2$:H.

Layers 1, 3, 5 . . . and layers 2, 4, 6 . . . may comprise any two of the materials where both are selected from the same class, e.g. a-Si:H/a-Si$_{1-x}$N$_x$:H or n-doped a-SiH/p-doped a-Si:H.

In addition the alternating layers may include one material from class 1 alternating with a material from class 2, e.g. a-Si:H/n-doped a-Si$_{1-x}$N$_x$:H.

The superlattice used in the present invention also includes layered materials where the composition of each layer is modulated across the layers. For example, if the alternating layers are a-Si:H and a-Ge:H alloys, the transition from a-Si:H to a-Ge:H and from a-Ge:H to a-Si:H may occur gradually over the layer thicknesses starting with a-Si:H, gradually increasing the percentage of a-Ge:H until it is all a-Ge:H. In the next adjacent layer, the percentage of a-Si:H is increased until it is all a-Si:H. All succeeding layers repeat this sequence.

The materials in the two groups can be prepared by plasma assisted decomposition of gaseous mixtures of volatile hydrides, fluorides or chlorides or of the elemental gases themselves in the case of O$_2$, N$_2$, Cl$_2$ and F$_2$, as described below.

Preparation of Superlattice Material

There are several deposition processes that are known to produce low defect density amorphous semiconductors. These include PCVD, low temperature CVD and sputtering. Low temperature CVD is restricted to reactive gases that decompose at relatively low temperature such as for example Si$_2$H$_6$. Sputtering has the advantage of being capable of producing a wider variety of amorphous semiconductor materials than can be made by PCVD or CVD, however, sputtered films usually contain more defects than PCVD films. We describe here a method for using PCVD to make amorphous semiconductor superlattices. To make amorphous semiconductor superlattices by CVD we simply omit the electric discharge used in the PCVD technique. To make amorphous semiconductor superlattices by sputtering it is possible to modify the technique (A. H. Eltoukhy and I. E. Greene *J. Appl. Phys.* 50, 505 (1979)) for making crystalline semiconductor superlattices by changing the deposition conditions (e.g. substrate temperature, gas pressure and addition of H$_2$ to the plasma discharge) to produce hydrogenated amorphous rather than crystalline semiconductors.

Figure 5:
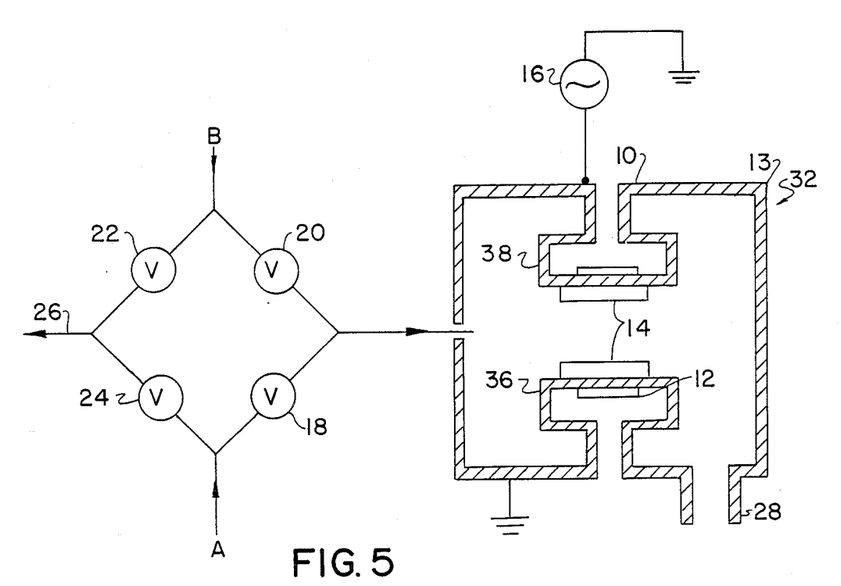
FIG. 5 is a schematic diagram of a plasma assisted chemical vapor deposition reactor.

Referring to FIG. 5 a PCVD apparatus for carrying out the fabrication of the superlattice material of the pesent invention is designated as 32. The PCVD apparatus includes a vacuum chamber typically of stainless steel. In the vacuum chamber 13 are electrodes 36 and 38. Electrode 36 is grounded and referred to as the anode. Electrode 38 is insulated from the stainless steel chamber by insulator 10 and is referred to as the cathode. Flat heaters 12 are contained in the electrodes. Substrates 14 which can be insulators such as quartz or metals such as stainless steel are placed in good thermal contact with the electrodes.

The plasma is produced by a low power (5-10 W) RF (13.5 MHz) discharge, by means of an RF generator 16 connected to the cathode. To deposit layered films the composition of the gas in the reactor 32 is changed periodically by opening and closing alternately pneumatic valves 18 and 20 to admit gas A or gas B into the reactor.

In order to avoid setting up pressure transients through the opening and closing of valves 18 and 20 the gases A and B are alternatively shunted into a ballast pump 26 by opening and closing valves 22 and 24 in phase with valves 18 and 20, respectively. The gases are pumped continuously out of the reactor by a pump through outlet 28.

To achieve abrupt changes in composition between adjacent layers requires that the time it takes to change gases in the reactor (molecular residence time) be short compared to the time it takes to grow a monolayer. The molecular residence time R is given by $$R = Vp/F_o P_o$$

where V is the volume of the reactor, p is the gas pressure in the reactor and $F_o$ is the gas flow rate at standard pressure $P_o$. R can be varied over a wide range of values. In our experiments we have used V=30 liters, p=30 m torr, Fo=0.1 liter/min which gives R =1 sec. with a typical deposition rate of 1 Å/sec. the transition from one layer to the next takes place in a time less than it takes to deposit a single atomic layer. The layer thickness is given by the product of the deposition rate and the flow period of the gas. The thickness of the layers can be varied from a single atomic layer to thousands of angstroms.

Example of amorphous semiconductor superlattice that have been produced include:

a-Si:H/a-Ge:H
a-Si:H/a-Si$_{1-x}$N$_x$:H
a-Si:H/a-Si$_{1-x}$C$_x$:H

The a-Si:H sublayers were made from pure SiH$_4$. The Ge:H layers were made from a mixture of 10% GeH$_4$+90% H$_2$. The a-Si$_{1-x}$C$_x$:H layers were made from a mixture of 50% SiH$_4$+50% CH$_4$. The a-Si$_{1-x}$N$_x$:H layers were made from a mixture of 20% SiH$_4$+80% NH$_3$. The substrate temperatures were in the range 180°-250° C.

Internal Electric Fields

It has been found that the amorphous superlattice material of the present invention have large electric fields (up to $4 \times 10^5$ V/cm) with the sign of the fields alternating between layers. For an a-Si:H/a-SiN$_x$:H amorphous superlattice, these fields are caused by electrons transferred from the nitride to the silicon which are asymmetrically distributed near the interfaces. The interface charge involved ($6 \times 10^{12}$ electrons cm$^{-2}$ is similar in magnitude to that observed in silicon nitride films deposited onto crystalline silicon. However, it is greatest when amorphous silicon is deposited onto silicon nitride, and is concentrated within 20 Å of the interface. This charge is due to strain relieving defects induced by lattice mismatch at the interface.

These large electric fields are distributed so that they point away from the substrate in the a-Si:H layer and toward the substrate in the a-SiN$_x$:H layer. These fields remove the symmetry normally present in amorphous materials, with the direction of the fields imposed by the order of deposition. This lack of reflection symmetry is necessary for a non-zero piezoelectric effect. The built-in electric fields between the layers take the place of the fields present between the atoms in a non-centro-symmetric crystal. In the example described below, the fields are large ($4 \times 10^5$ V/cm) similar in magnitude to atomic fields.

It is also possible to remove the intrinsic symmetry by grading the composition of the amorphous superlattice in an asymmetric manner. For example, FIG. 2 shows the electron energy diagram of a material where the composition is changed gradually from a-Si:H to a-SiN$_x$:H to a point where it is abruptly changed back to a-Si:H to begin a new layer. Such a material would have large asymmetric built-in fields and thus be piezoelectric.

Charged defects exist at interfaces both in crystalline and amorphous materials. Thus, both crystalline and amorphous superlattice materials have large built-in fields which remove reflection symmetry. In the case of some crystalline superlattices, this allows an electro-optic effect whereas in others (which intrinsically lack a center of symmetry) it adds to the already present effect.

Measurement of the Internal Electric Fields

The built-in electric fields in these layered structures have been measured from electroabsorption spectroscopy. Electroabsorption is the change in optical absorption due to an applied electric field, commonly known in crystals as the Franz-Keldysh effect. Electroabsorption in amorphous semiconductors has been studied both theoretically and experimentally, see e.g., B. Esser, Phys, Stat. Solid; (b) 51, 735, (1972); J. Stuke and G. Weiser, Phys. Stat. Solidi 17, 343 (1966) and R. A. Street, T. M. Searle, I. G. Austin and R. S. Sussman, J. Phys. C. 7, 1582 (1974).

The effect is a maximum at photon energies near the bandgap and decreases sharply at lower energies. In addition to providing spectroscopic information about thin film materials, electroabsorption can be used to determine internal electric fields in device configuration. Nonomura et al, Jap. J. Appl. Phys. 21, L464 (1982), have measured the built-in potential of n-i-p amorphous silicon solar cells by monitoring the transmission of a film subjected to both a constant and an alternating field. The electroabsorption signal goes to zero when the applied dc field cancels out the internal fields thereby yielding the built-in potential.

Internal Electric Field for a-Si:H/a-SiN$_x$:H

The material used in this measurement were made up of alternating layers of amorphous silicon hydride (a-Si:H) and amorphous silicon nitride (a-Si N$_x$:H) deposited by plasma assisted chemical vapor deposition of silane and silane:ammonia (1:4 by volume) mixtures as described above. The plasma was not interrupted between layers. Silicon layer thicknesses varied between 8 Å and 1200 Å. Ohmic contacts were used in a sandwich structure so that contact potential did not distort the results.

Making use of the boundary condition that the normal component of the applied electric displacement D=$\epsilon$E is constant, the field within the sample D(x) is the sum of applied and built-in fields:

$$D(X) = D_{dc} + D_{ac} \cos(\omega t) + D_{bi}(x) \tag{1}$$

Here $D_{dc}$ is the dc component and $D_{ac}$ *is the ac component of the applied fields.* $D_{bi}$ (x) is the built-in field, and x is the distance normal to the layers. The local absorption constant changes as the square of the field $$\Delta(x) = \alpha_o(x)[1 + KD^2(x)]\qquad (2)$$

where $\alpha_o(x)$ is the zero-field absorption coefficient and K is an electro-optic material parameter which varies with photon energy. In a transmission measurement such as performed here the quantity measured is the change in the spatial average of $\alpha(x)$.

$$\overline{(\alpha - \alpha_o)} = \frac{1}{d} \int \alpha_o(x) KD^2(x) dx \qquad (3)$$

where d is the sample thickness. A lock-in detector was used to isolate the portion, $\Delta\alpha_\omega$, of (3) which varied at the frequency $\omega$. Substituting (1) into (3) we obtain $$\Delta\alpha_\omega = \frac{2}{d} D_{ac} \int \alpha_o(x) K[D_{dc} + D_{bi}(x)] dx \qquad (4)$$

Because the bandgap of a-SiN$_x$ is ~4 eV, we can assume that the silicon nitride layers contribute negligibly over the photon energy range studied (1.2–3.0 eV). Assuming that the built-in fields are the same in each silicon sublayer, simple electrostatics gives the change in absorption in terms of the applied voltages $V_{ac}$ and $V_{dc}$:

$$\Delta\alpha_\omega \sim \alpha_{so} K_s V_{ac} \left[ \phi_s + (V_{dc}/N)\left(1 + \frac{L_n\epsilon_s}{L_s\epsilon_n}\right)^{-1} \right] \qquad (5)$$

Here $\alpha_{SO}$ and $K_S$ are the absorption and electroabsorption constants of å-Si:H$_x$, and N is the number of layer pairs. The sublayer thicknesses are $L_S$ and $L_n$ for the a-Si:H and a-SiN$_x$:H layers, and the dielectric constants are $\epsilon_s = 12 \epsilon_o$ and $\epsilon_n = 7.5 E_o$. This equation gives the built-in potential across a single silicon layer, $$\phi_s = \int_o^{L_s} (D/\epsilon_s) dx.$$

Figure 6:
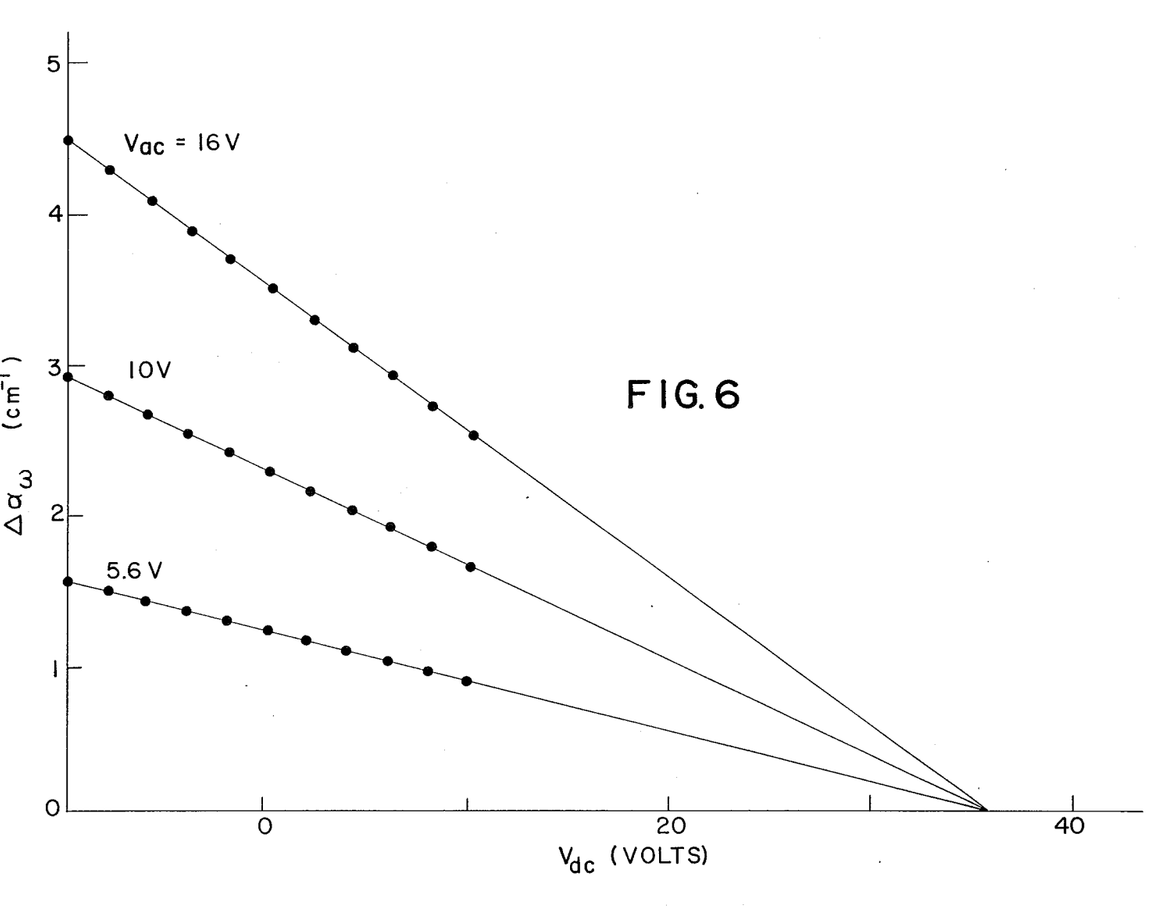
FIG. 6 shows the electroabsorption signal vs. dc voltage for a Si/SiN$_x$ superlattice with layer thickness $L_S = 20$ Å; sample thickness 1.0 $\mu$m, photon energy 1.94 eV.

FIG. 6 shows $\Delta\alpha_\omega$ plotted against $V_{dc}$ for two flms with $V_{ac}$ as a parameter. The linearity with respect to $V_{dc}$ and $V_{ac}$ expressed in (5) was obeyed exactly to within experimental error (3%). The $V_{dc}=36$ V intercept of the lines in FIG. 6 is given by $V_{dc}=\phi_s N(L_s\epsilon_n + L_n\epsilon_s)/L_s\epsilon_n$. This intercept varies from film to film as the thickness and potential changes, and was as high as 72 V. This is much too high to be accounted for by contact effects. Films of the same layer thicknesses but varying in total sample thickness from 0.2 to 4 $\mu$m yielded the same $\phi_s$ within 20%.

The built-in potentials can only be caused by charges which are asymmetrically placed within the layers so that reflection symmetry is absent in the material. Their existence shows that the order of deposition determines the properties of the interfaces. The asymetry is caused by structural defects created during the deposition. Silicon differs greatly from silicon nitride both in crystal structure and lattice constant. These structural mismatches cause strain at the interface which is relieved as the material grows through the introduction of defects. When silicon is deposited onto silicon nitride, these defects are primarily in the silicon because it is much easier to introduce defects into the silicon as it is growing than it is to introduce them into the already grown nitride. It is reasonable to expect that the defect density would be proportional to the strain produced by the lattice mismatch and that the strain is relieved a defects are introduced. In this case, the defect density would decrease exponentially with the distance from the interface.

It is believed that these materials are proximity doped; the silicon layers are heavily n-type due to electrons transferred from the nitride layers. In amorphous materials, both these electrons and the corresponding positive charges would be expected to lie in defect states which could be concentrated at the interfaces. If one assumes that the charges causing the built-in fields are negative in the silicon and positive in the nitride as well, the sign of the built-in fields observed here imply that more charge is transferred at the interface where silicon is deposited onto silicon nitride. Because our technique is sensitive only to the difference between the two interfaces, we assume that all charges reside near that interface. From the change in built-in potential as the sublayer thicknesses are varied, we can determine the actual distribution of charge near the interface.

Figure 7:
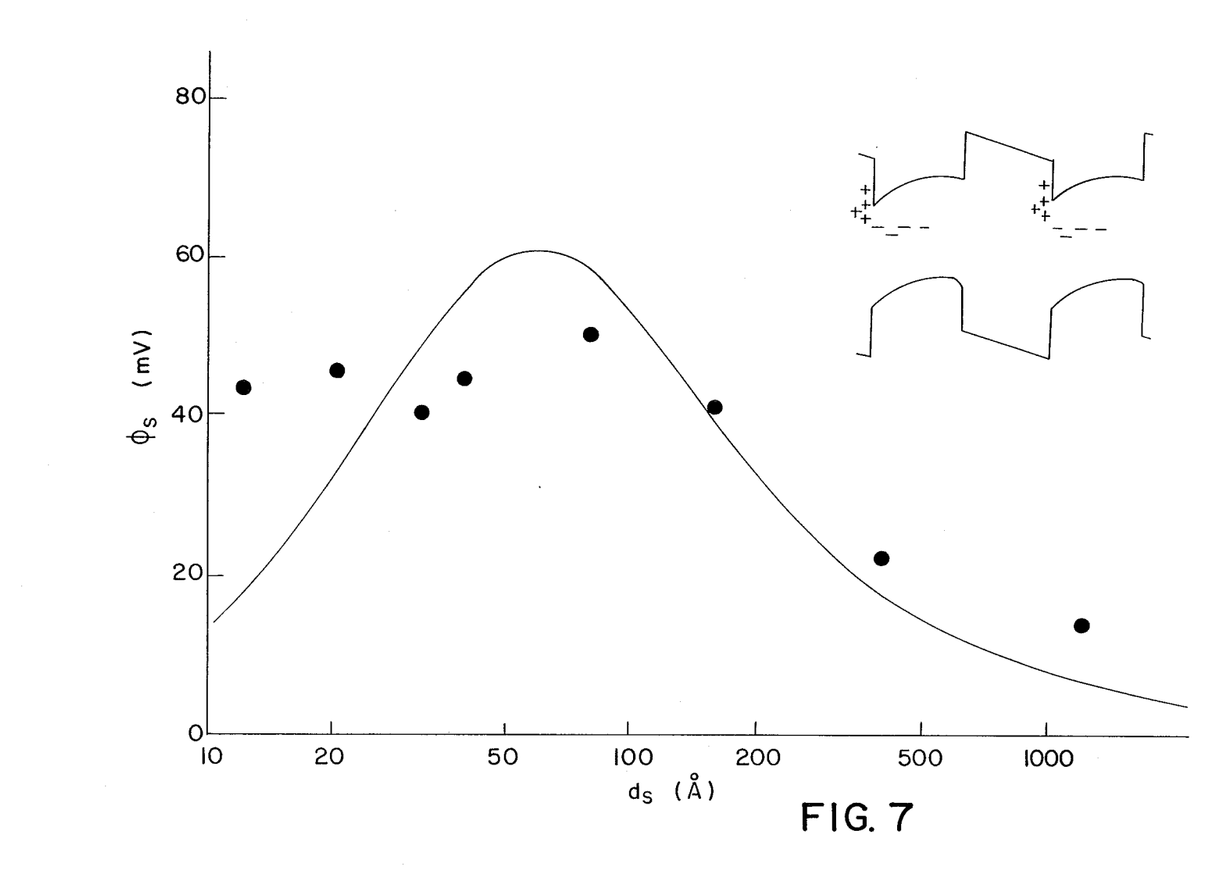
FIG. 7 shows the variation of the single-layer built-in potential $\phi_S$ with silicon layer thickness $L_S$. The inset shows the charge distribution model chosen for the theoretical line drawn.

Assume a density of traps in the silicon layer which decreases exponentially away from the interface, with exponential width $\lambda$, according to $n_t = \rho_o \exp(-x/\lambda)$. These traps are filled, leaving a positive interface charge on the nearby interface, as shown in the inset to FIG. 7. If the charge density is independent of layer thickness, electrostatic calculations show that the resultant built-in potential is $$\phi_S = \frac{\rho_o e l L_n}{L_n \epsilon_s + L_s \epsilon_N} [l - (l + L_s)\exp(-L_s/l)] \qquad (6)$$

where e is the electronic charge. This model is compared with the results obtained for materials with different silicon layer thicknesses $L_S$ in FIG. 7. Here a positive $\phi_S$ designates a field which points away from the substrate. A reasonable qualitative fit is obtained with a defect density of $\rho_o = 3 \times 10^{19} \text{cm}^3$ and exponential width $\lambda = 20$ Å. A decrease in $\phi_S$ at larger $L_S$ is observed, consistent with the charge distribution model. However, the built-in potential remains high for low $L_S$, (FIG. 7) indicating that the defect distribution is more sharply peaked close to the interface than the exponential assumed.

The total interface charge density measured here is $\rho_o = 6 \times 10^{12}$ electrons cm$^{-2}$. This can be compared with the surface charge which has been measured when amorphous silicon nitride is deposited onto crystalline silicon. Such interfaces are important in some metal-insulator-silicon devices. Surface charge densities have been determined from capacitance-voltage characteristics in films deposited by rf glow discharge, chemical vapor deposition and sputtering, see e.g., R. C. G. Swann, R. R. Mehta and T. P. Cauge, J. Electrochem. Soc. 14, 713 (1969); and S. M. Hu, J. Electrochem. Soc. 113, 693 (1966). These measurements show a charge transfer of the same sign as that observed here, with a density between $1 \times 10^{12}$ and $6 \times 10^{12}$, depending upon the method of deposition. The present invention has shown that in amorphous/amorphous interfaces, the interface charge is greatest when silicon is deposited onto silicon nitride. Electrons are concentrated in silicon defects within 20 Å of the interface.

Figure 8:
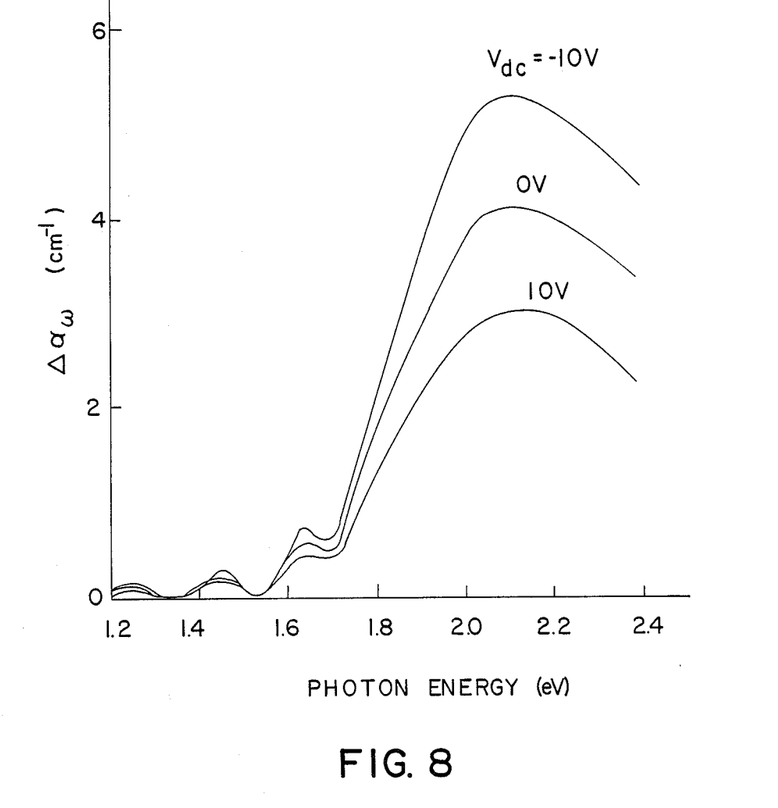
FIG. 8 shows the electroabsorption spectrum for sample as in FIG. 6, for three values of $V_{dc}$ where $V_{ac}$ was held constant at 16V.

Additional information about the interface can be obtained from the spectral dependence of the electroabsorption signal, as shown in FIG. 8. The spectrum is similar to that observed from an unlayered a-Si:H sample except for a small bandgap increase due to carrier confinement. The small signal observed at low photon energies (h$\gamma$<1.6 eV) is due to refractive index changes. The spectral shape observed is the same for all values of $V_{dc}$. In other words, the built-in potential $\phi_s$ is independent of photon energy, for h$\gamma$ as high as $E_g$+0.6 eV. This verifies that the absorption in the nitride layer is negligible. It also indicates that the bandgap changes relatively sharply at the interface between the two layers, for there are no appreciable electric fields in the transition region. This was observed in all the samples studied. In the case of the sample shown in the figures, the built-in voltage changed by lesss than 3 V out of 30. With a field of $4\times10^5$ V/cm at the interface, this indicates that the bandgap shift of 0.6 eV occurs within 3Å of the interface. This measurement confirms the essentially monolayer shift observed previously by x-ray scattering.

Electrooptic Coefficients

The electrooptic coefficient is the proportionality constant between the change in refractive index of a material and an applied electric field. There exist both a linear electrooptic effect, where the index change is proportional to the field, and a quadratic effect, where the index change is proportional to the square of the field. It is well-known in the art that while all materials exhibit the quadratic effect, the linear electrooptic effect is strictly limited to materials lacking reflection symmetry. The amorphous superlattice materials described here lack reflection symmetry due to the internal built-in fields. These fields, in combination with the quadratic electrooptic effect present in all materials, yield the linear electrooptic effect. In order to have a large linear effect in the superlattice materials, the quadratic coefficients of the two layers of alternating materials should be different from each other. If this is not the case, then the linear electrooptic effects in the two alternating layers cancel because the electric fields in the two alternating layers are equal and opposite. This criterion is met in the superlattice materials of the invention, because the alternating layers are different materials with different bandgaps.

Figure 9:
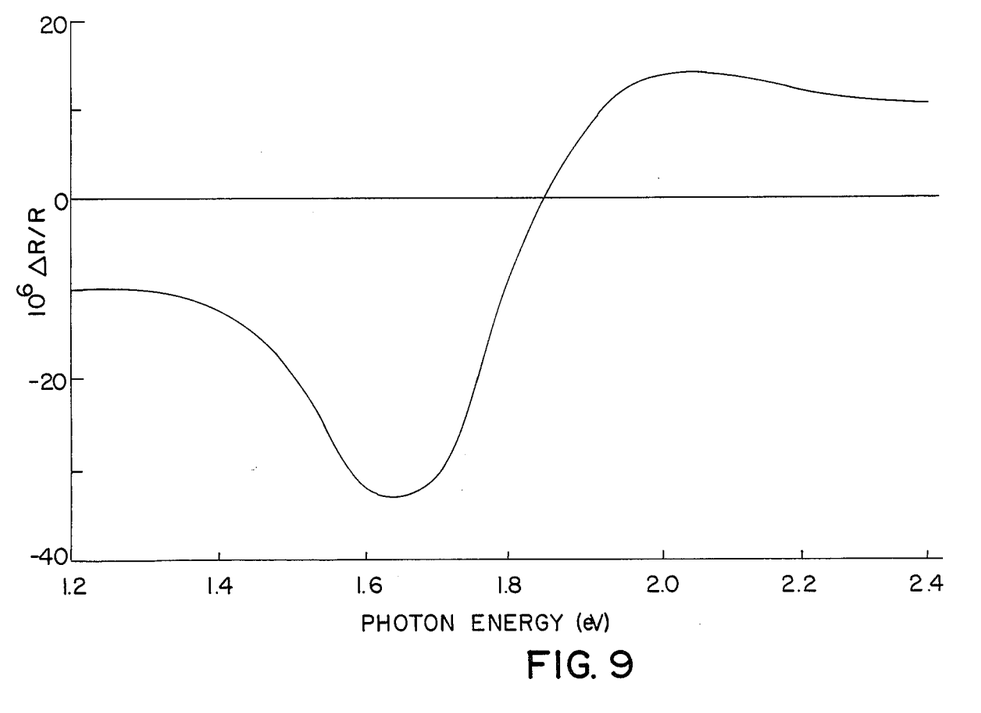
FIG. 9 shows the electroreflection spectrum of a silicon/silicon nitride superlattice film.

The electrooptic coefficients have been determined in layered materials using electroreflectance. In this technique the change in reflection from an interface due to an applied electric field is measured. FIG. 9 shows the electroreflection spectrum of a silicon/silicon nitride superlattice film. An alternating voltage of 11 volts was applied between a transparent palladium front contact and an ohmic back contact. The data shows a change in reflectance of $-3\times10^{-5}$ at a photon energy of 1.6 eV. This change in reflectivity is due to a change in the index of the superlattice film. The reflectivity can be directly related to the index using the Fresnel equations. These relations imply an electrooptic coefficient of $r_{13}=1.6\times10^{-11}$ m/V. Here $r_{13}$ is the proportionality constant between change in the index of refraction for optical fields parallel to the layers (direction "1") and the electric field perpendicular to the layers (direction "3"). This can be compared with $r_{13}=8\times10^{-12}$ m/V for a BaTiO$_3$ crystal, a frequently used electrooptic material. Thus these layered materials have electrooptic properties which compare quite favorable to the best currently available materials.

The large electrooptic coefficients measured here thus imply a large non-linear susceptibility as well. Thus, a waveguide made from amorphous superlattices could be used to generate second harmonic light. Other non-linear processes such as sum and difference frequency generation would be possible as well.

EXAMPLE 1

Figure 10:
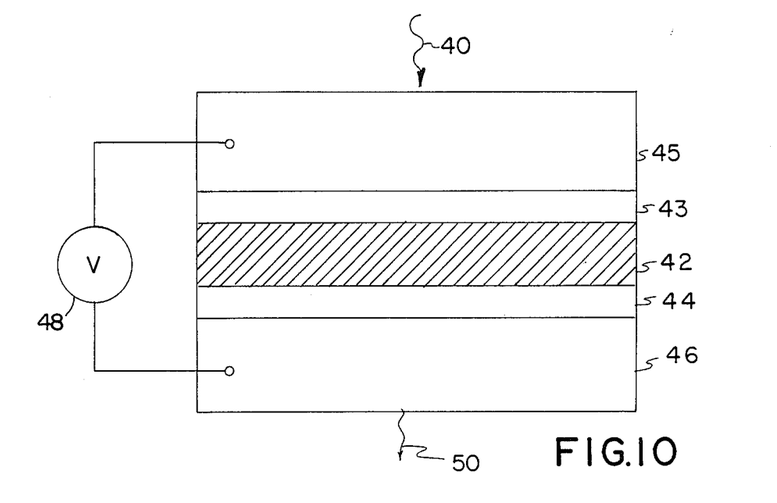
FIG. 10 shows an optical modulator wherein an amorphous superlattice material is sandwiched between two dielectric mirrors and two transparent conductors.

The superlattice material described herein can be used to form an optical modulator as shown in FIG. 10. An amorphous superlattice material 42 is sandwiched between two dielectric mirrors 43 and 44 and two transparent conductors 45 and 46 to form a Fabry-Perot etalon. The dielectric mirrors could potentially be made at the same time as the superlattice, of identical or different materials. Alternatively, metal mirrors could be used. The entire modulator could be fabricated in a single vacuum chamber, over a large area substrate.

This modulator changes its transmission upon the application of an electric potential 48 between the electrodes 45 and 46. The electric field resulting from that potential changes the index of refraction in the superlattice material due to the electrooptic effect. The change in index shifts the resonance of the optical etalon, resulting in an increase in the optical transmission. If the modulator is illuminated with a steady optical beam 40, the output 50 will be modulated according to the electric potential applied.

This geometry is similar to that described by Phelan et. al. (Appl. Phys. Lett. 38, 596 (1981)), except that dielectric mirrors and an amorphous superlattice are used, rather than metal mirrors and amorphous silicon. Electroreflectance experiments indicate that layered silicon/silicon nitride materials have electrooptic coefficients two orders of magnitude greater than those of ordinary amorphous silicon. Thus, an amorphous superlattice modulator would require lower voltages for complete modulation. In addition, the layered material is an excellent insulator, so that ohmic heating is not a problem.

Dielectric mirrors are better than metal ones because they have negligible loss while retaining reflectivities higher than 99%. Thus, the modulator shown in FIG. 10 would have higher throughput and lower modulation voltages.

EXAMPLE 2

Figure 11:
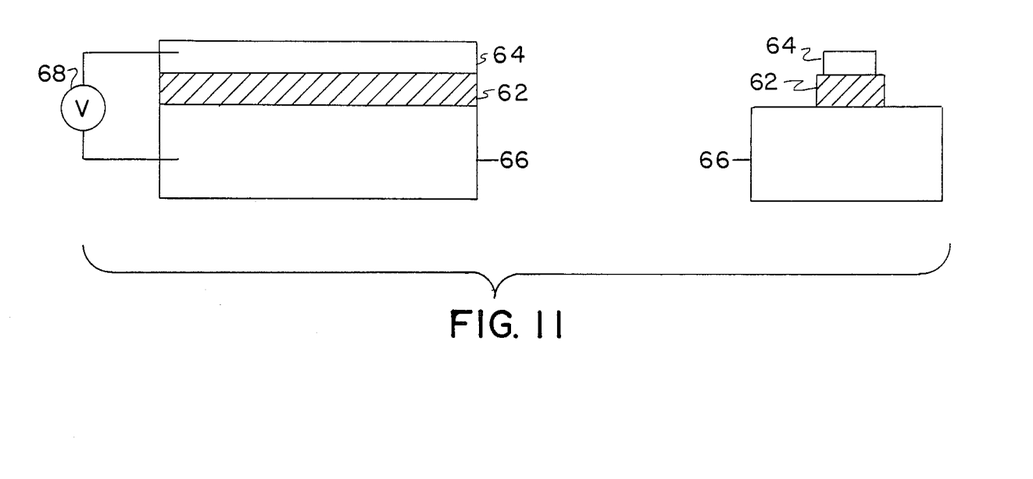
FIG. 11 shows an optical waveguide of amorphous superlattices.
Figure 12:
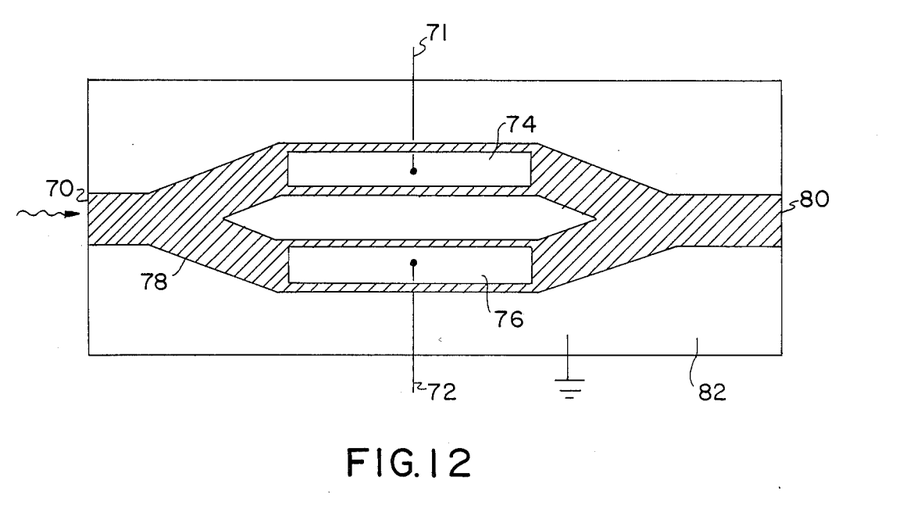
FIG. 12 shows an interferometric amplitude modulator wherein two waveguide phase modulators are combined.

It is also possible to make optical waveguides of amorphous superlattices, as shown in FIG. 11. A voltage 68 applied between two transparent conductors 64 and 66 across the superlattice layer 62 modulates the phase of the output light. Two waveguide phase modulators can be combined to form an interferometric amplitude modulator as shown in FIG. 12, see e.g., Leonberger et. al., Appl. Phys. Lett. 40, 565 (1982)).

Light incident on the input 70 is trapped in the amorphous superlattice waveguide 78. This waveguide forks to split the light into two parts which pass under the conductors 74 and 76. Voltages 71 and 72 applied between these conductors and the conducting substrate 82 alter the phase of the lightbeam in each path. When the two beams are brought together again interference occurs to modulate the intensity coming out of the waveguide output 80. If the phase of the two paths is the same within an integral multiple of 2, then the output is maximized. If they are out of phase, then less light is output.

Such modulators are currently made from Lithium Niobate to provide ultrafast (1 Gbit/s) modulation of light for optical communication. Layered amorphous superlattices are superior to crystalline materials for many applications because they can be deposited easily at a low temperature without any lattice matching constraint. Thus, they can be deposited onto the same chip as a laser diode and modulation electronics, yielding a complete laser/modulator integrated circuit. In addition, shorter modulator lengths are required due to the larger electrooptic coefficient.

The same symmetry conditions which apply to electrooptics apply to non-linear optical devices as well. In theory the two effects differ only in the frequency of the electric field which is used. Electrooptics is an effect involving a low frequency field and an optical field, whereas non-linear optics uses two optical fields.

What is claimed is:

1. An electrooptic device in which the active materials comprises a superlattice which includes a multilayered amorphous material having non-zero linear electrooptic coefficients due to the presence of internal built-in electric fields caused by charge distributed asymmetrically in the layers, wherein adjacent layers have different values of quadratic electrooptic coefficients and wherein an applied voltage of said active material controls propagation of light through said active material.

2. An electrooptic device of claim 1 in which the superlattice includes a multilayered material whose optical index of refraction changes with an applied electric field.

3. The device of claim 2 wherein the superlattice includes layers of amorphous silicon hydride alternating with amorphous silicon nitride hydride (a-Si:H/a-SiN$_x$:H).

4. The device of claim 2 wherein the superlattice includes layers of amorphous silicon hydride alternating with amorphous silicon carbide hydride (a-Si:H/a-SiC$_x$:H).

5. An electrooptic device of claim 1 in which the superlattice includes a multilayered material which is anisotropic.

6. The device of claim 1 wherein the superlattice includes layers of amorphous silicon hydride alternating with amorphous silicon nitride hydride (a-Si:H/a-SiN$_x$:H).

7. The device of claim 1 wherein the superlattice includes layers of amorphous silicon hydride alternating with amorphous silicon carbide hydride (a-Si:H/a-SiC$_x$:H).

* * * * *